(12) United States Patent
Galloway

(10) Patent No.: US 6,937,431 B2
(45) Date of Patent: Aug. 30, 2005

(54) MATCHING PEAK VELOCITIES OF ACCELERATION AND DECELERATION SEEK PROFILES IN A DISC DRIVE

(75) Inventor: Paul A. Galloway, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 307 days.

(21) Appl. No.: 10/226,056

(22) Filed: Aug. 22, 2002

(65) Prior Publication Data

US 2003/0189784 A1 Oct. 9, 2003

Related U.S. Application Data

(60) Provisional application No. 60/371,032, filed on Apr. 9, 2002.

(51) Int. Cl.$^7$ ............................................... G11B 5/596
(52) U.S. Cl. ................................................... 360/78.06
(58) Field of Search ........................ 360/78.06, 78.04, 360/78.07, 234.3; 700/245

(56) References Cited

U.S. PATENT DOCUMENTS

| | | | |
|---|---|---|---|
| 4,096,579 A | | 6/1978 | Black et al. ................. 364/900 |
| 4,125,882 A | | 11/1978 | Erickson, Sr. et al. ......... 360/78 |
| 4,257,074 A | | 3/1981 | Goss ............................ 360/78 |
| 4,439,800 A | | 3/1984 | Powell ......................... 360/78 |
| 4,477,755 A | | 10/1984 | Rickert ....................... 318/611 |
| 4,532,562 A | | 7/1985 | Powell ......................... 360/78 |
| 4,591,933 A | | 5/1986 | Quakenbush ................. 360/78 |
| 4,677,507 A | | 6/1987 | Elliott ......................... 360/78 |
| 4,937,689 A | | 6/1990 | Seaver et al. ............. 360/78.07 |
| 5,166,845 A | * | 11/1992 | Thompson et al. ....... 360/234.3 |
| 5,254,920 A | | 10/1993 | Agarwal et al. ............ 318/560 |
| 5,282,100 A | | 1/1994 | Tacklind et al. .......... 360/97.02 |
| 5,347,446 A | * | 9/1994 | Iino et al. ..................... 700/29 |
| 5,471,477 A | | 11/1995 | Wachi et al. ............. 369/44.28 |
| 5,475,545 A | | 12/1995 | Hampshire et al. ...... 360/78.06 |
| 5,657,179 A | | 8/1997 | McKenzie ............. 360/78.06 |
| 5,668,680 A | | 9/1997 | Tremaine ................. 360/78.07 |
| 5,696,647 A | | 12/1997 | Phan et al. .............. 360/78.07 |
| 5,781,373 A | | 7/1998 | Larson et al. ............ 360/97.02 |
| 6,011,668 A | * | 1/2000 | Choi ....................... 360/78.06 |
| 6,031,683 A | * | 2/2000 | Iverson et al. ........... 360/78.04 |
| 6,195,222 B1 | * | 2/2001 | Heminger et al. ....... 360/78.07 |
| 6,341,246 B1 | * | 1/2002 | Gerstenberger et al. .... 700/245 |
| 6,445,531 B1 | * | 9/2002 | Gaertner et al. ......... 360/78.06 |
| 6,614,617 B1 | * | 9/2003 | Galloway ................ 360/78.06 |

* cited by examiner

Primary Examiner—David Hudspeth
Assistant Examiner—Fred F. Tzeng
(74) Attorney, Agent, or Firm—Westman, Champlin & Kelly, P.A.

(57) ABSTRACT

A seek operation is performed by identifying a seek length of the seek operation and selecting a representation of a deceleration position-velocity profile based on the seek length. Successive demand velocity values are selected during the seek operation by identifying a distance-to-go and a distance-traveled of the seek length, calculating a representation of an acceleration demand velocity based on the identified distance-traveled and a representation of an acceleration position-velocity profile, identifying a representation of a deceleration demand velocity based on the identified distance-to-go and the selected representation of a deceleration position-velocity profile, and selecting the representation of either the acceleration demand velocity or the deceleration demand velocity. The representation of acceleration demand velocity is preferably performed by using a first scaling factors based on the seek length to adjust the identified distance-traveled, and using a second scaling factor based on the seek length to adjust a representation of a demand velocity of a normalized position-velocity profile.

25 Claims, 8 Drawing Sheets

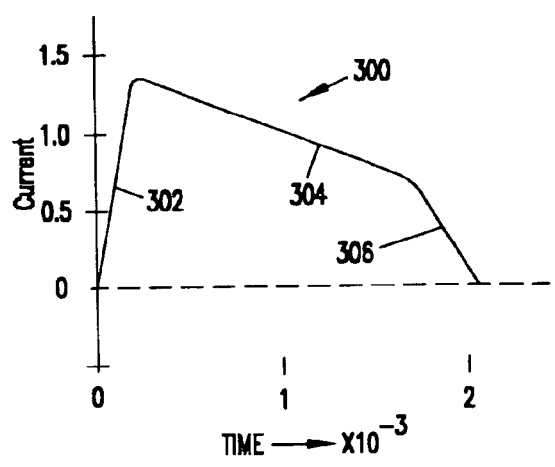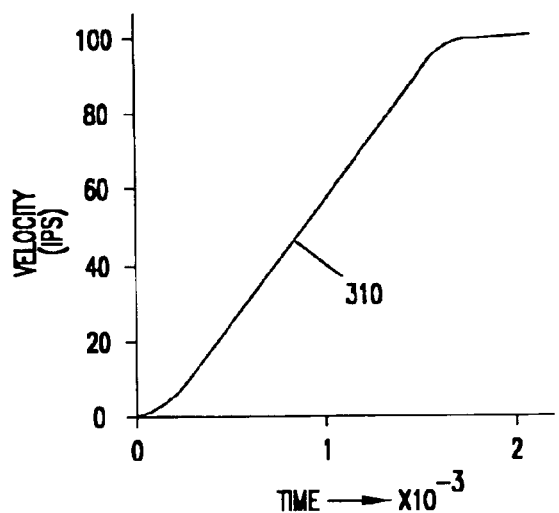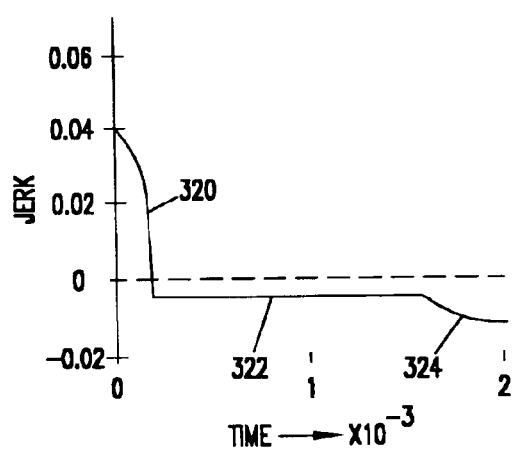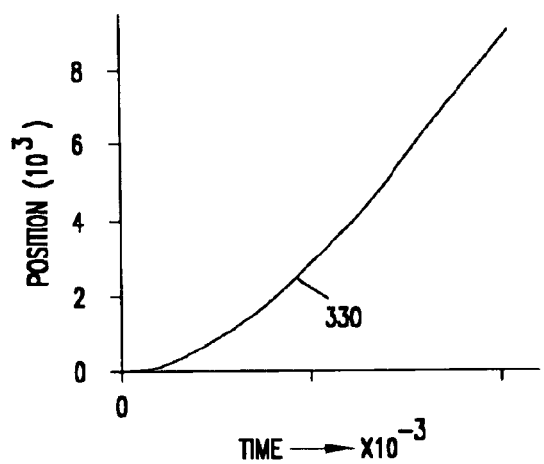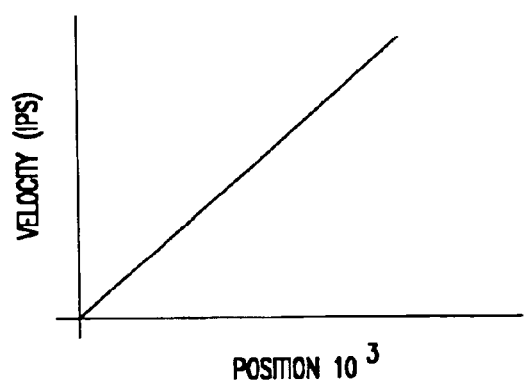

MATCHING PEAK VELOCITIES OF ACCELERATION AND DECELERATION SEEK PROFILES IN A DISC DRIVE

CROSS-REFERENCE TO RELATED APPLICATION

This application claims priority of U.S. Provisional Application No. 60/371,032 filed Apr. 9, 2002 for "Noise & Vibration Reduction During Disk Drive Seek".

FIELD OF THE INVENTION

This invention relates to disc drive data storage systems, and particularly to improved seek controllers for disc drives to reduce noise and vibration.

BACKGROUND OF THE INVENTION

Magnetic disc drive storage devices store digital data on rotatable magnetizable disc surfaces. Data are written to and read from concentric tracks on the disc by read and write transducers, usually called "heads", that are supported by an actuator arm that positions the head relative to the tracks on the confronting disc. A voice-coil actuator motor rotates the actuator arm to move the head along an arcuate path generally radially across the disc. Actuator current applied to the actuator motor accelerates the rotational motion of the arm to move the head radially across the disc.

The head reads position data identifying its position on the disc and supplies position data to a seek controller. The seek controller is responsive to the position data to operate in either of two modes, a track seek mode or a track follow mode. In the track follow mode, the seek controller supplies a small current to the actuator motor to move the arm and maintain the head over the center of the selected track being followed.

In the track seek mode, the seek controller supplies current to the actuator motor to accelerate and decelerate movement of the arm across several radial tracks between an initial or start track and a desired destination track. Many disc drive seek controllers employ sets of velocity profiles in the form of lookup tables that identify reference or demand velocities over the acceleration and deceleration phases of the seek. A velocity profile is selected based on the start and destination tracks of the seek operation. The controller applies a current to the actuator motor as selected from the table to accelerate radial movement of the head until the actual velocity equals a peak demand velocity of the selected seek profile. Ordinarily, the demand velocity varies as a function of the seek distance-to-go so that the controller accelerates the actuator to the peak demand velocity and then decelerates the actuator to near zero at the destination track.

In long seeks, the peak demand velocity might match a design maximum velocity of the disc drive, in which case the velocity profile includes a "coast" phase between the acceleration and deceleration phases where the demand velocity is constant and is equal to the design maximum velocity for the disc drive. Upon reaching the destination track, the seek controller switches from the seek mode to the track follow mode.

The controller employs a closed loop control that attempts to minimize the velocity error between the actual velocity and the demand velocity. At the beginning of a seek operation, the demand velocity ordinarily is a high value due to the large distance-to-go seek length. Usually, the demand velocity is equal to the peak demand velocity of the selected velocity profile at the start of the seek and over the acceleration phase. Because the actual velocity of the actuator is at or near zero at the start of a seek and the demand velocity is at its peak, there is a large initial velocity error. The closed loop nature of the seek controller will attempt to reduce the velocity error as quickly as possible. Consequently, the controller accelerates the actuator by forcing a maximum current into the actuator motor. The high current induces considerable noise and vibration in the disc drive. During the coast and deceleration phases, the actual velocity closely matches the demand velocity, so the current is acoustically quiet.

The velocity lookup tables are used by the seek controller to supply current to the actuator motor and control the actuator velocity radially across the disc. The controller pumps current into the actuator voice coil motor to accelerate the actuator until the actual velocity reaches the peak demand velocity required by the lookup table. The controller thereafter operates the actuator motor to decelerate the actuator from the peak demand velocity to zero at the destination track. In long seeks, the peak demand velocity may be the design maximum velocity established for the disc drive, in which case the acceleration phase ends at the maximum velocity and the deceleration phase begins at the maximum velocity. In any case, during the deceleration phase, and any coast phase, the velocity error is small so the closed loop controller will closely "follow" the demand velocity profile until the final destination track is reached.

Employing a single lookup table from seek start to seek end is a simple approach, but acoustically noisy. To reduce noise and vibration during seek operations, Seagate Technology LLC introduced the use of two lookup tables for each seek operation into certain of its Cheetah® disc drives. One table is based on a position-velocity profile over a normalized acceleration phase of the seek. The other table is selected from a group of deceleration phase position-velocity tables. Two scaling factors, called Vscale and Xscale factors, are used to manipulate the demand velocity profile of the acceleration lookup table. The peak demand velocity (end velocity) of the manipulated acceleration lookup table is intended to closely match the peak demand velocity (starting velocity) of the deceleration lookup table to complete the seek cycle. The Vscale and Xscale factors are derived from the seek length associated with the seek command and the design maximum velocity for the disc drive seek.

The technique employed in the Cheetah disc drive works quite well, especially on long seeks where the actuator arm is permitted to "coast" at the design maximum velocity between the acceleration and deceleration phases. However on shorter seeks, there is no "coast" phase between the acceleration and deceleration phases. Consequently, if the peak demand velocity of the manipulated acceleration table did not exactly match the peak demand velocity of the selected deceleration table, an abrupt change in demand velocity occurred at the cross-over from the acceleration to the deceleration phase. This change in demand velocity resulted in a mis-match of the peak velocities of the acceleration and deceleration phases, occasionally generating a noticeable noise that adversely affected operation of the disc drive.

The present invention provides a solution to this and other problems, and offers other advantages over the prior art.

SUMMARY OF THE INVENTION

In one embodiment of the invention, a seek operation is performed by identifying a seek length of the seek operation, selecting a deceleration position-velocity profile based on the seek length, and selecting successive demand velocity values during the seek operation. Each successive demand velocity value is selected by identifying a distance-to-go and a distance-traveled of the seek length. An acceleration phase demand velocity value is calculated based on the identified distance-traveled and an acceleration position-velocity profile. A deceleration phase demand velocity value is identified based on the identified distance-to-go and the selected deceleration position-velocity profile. The demand velocity is selected as either the acceleration phase demand velocity value or the deceleration phase demand velocity value.

In some embodiments, the acceleration phase demand velocity value is calculated from first and second scaling factors that are based on the seek length. The distance-traveled is adjusted by the first scaling factor, and a velocity value of a normalized position-velocity profile for the acceleration phase is identified based on the adjusted distance traveled. The identified velocity value is adjusted based on the second scaling factor. In some embodiments, the first and second scaling factors are calculated using quadratic equations.

In another embodiment of the invention, servo apparatus moves a head between a start track and a destination track in response to a seek command. An actuator is responsive to a representation of a demand velocity to move the head between tracks. A seek length identifier identifies a seek length between the start and destination tracks, and a calculator is responsive to the identified seek length to calculate an adjustment factor. Position detection apparatus identifies a current position of the head. First storage apparatus stores a plurality of deceleration position-velocity tables each correlating head position to seek velocity through respective deceleration phases of seek operations. The first storage apparatus is responsive to the identified seek length to select a deceleration position-velocity table, and is responsive to the identified current position of the head to select a representation of a first demand velocity from the selected deceleration position-velocity table. A second storage apparatus stores an acceleration position-velocity table correlating head position to seek velocity through an acceleration phase of seek operations. The second storage device is responsive to the identified current position of the head and to the adjustment factor to provide a representation of a second demand velocity. A selector is responsive to the first and second storage apparatus to select the representation of either the first or second demand velocity for the actuator.

Other features and benefits that characterize embodiments of the present invention will be apparent upon reading the following detailed description and review of the associated drawings.

BRIEF DESCRIPTION OF THE DRAWINGS

FIG. 6 is an ideal current profile for an acceleration phase of a seek operation, and FIGS. 7–10 are velocity, jerk and position diagrams illustrating the performance of a disc drive operated by an ideal current profile of FIG. 6.

DETAILED DESCRIPTION OF ILLUSTRATIVE EMBODIMENTS

Figure 1:
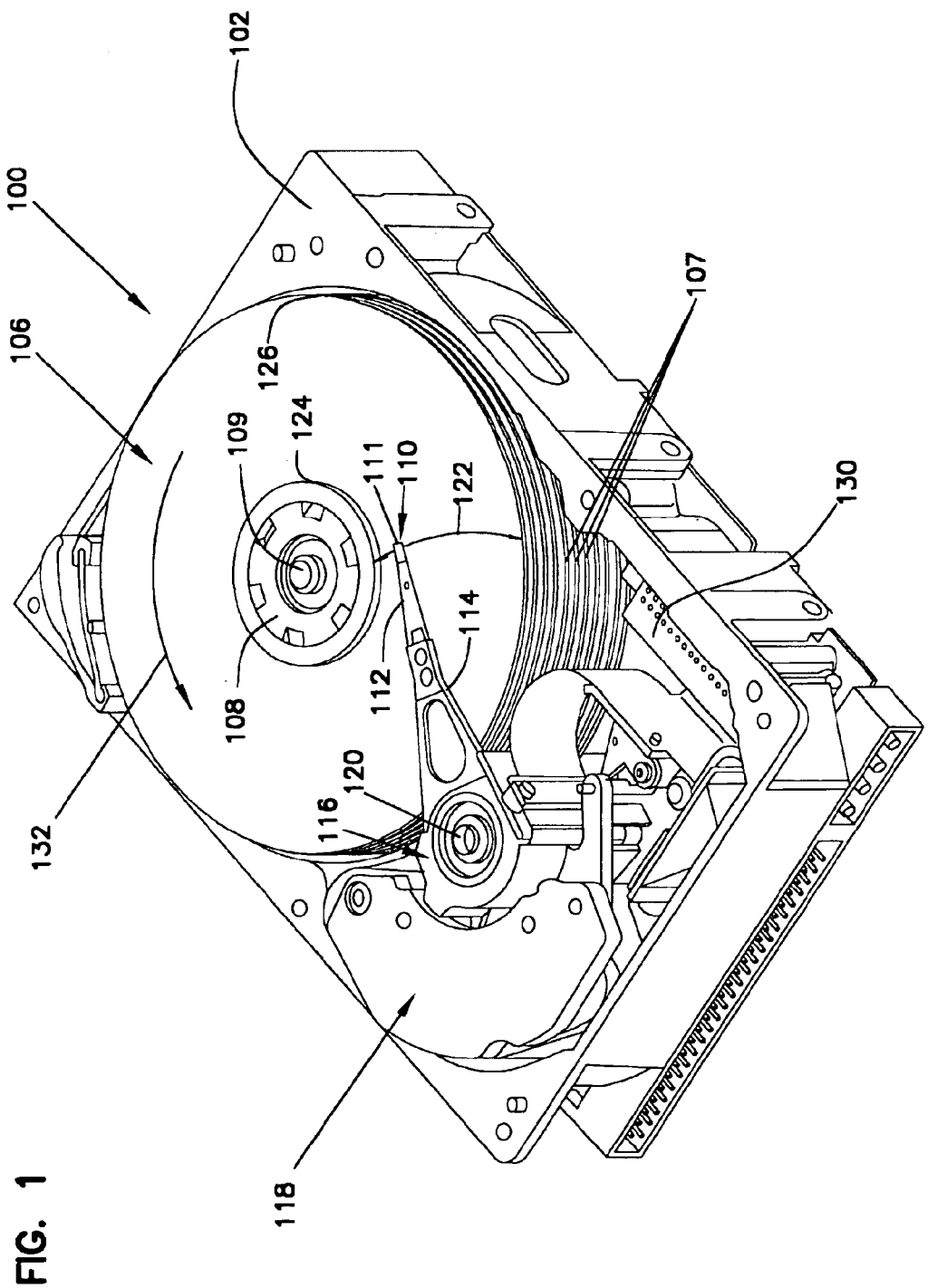
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

Figure 2:
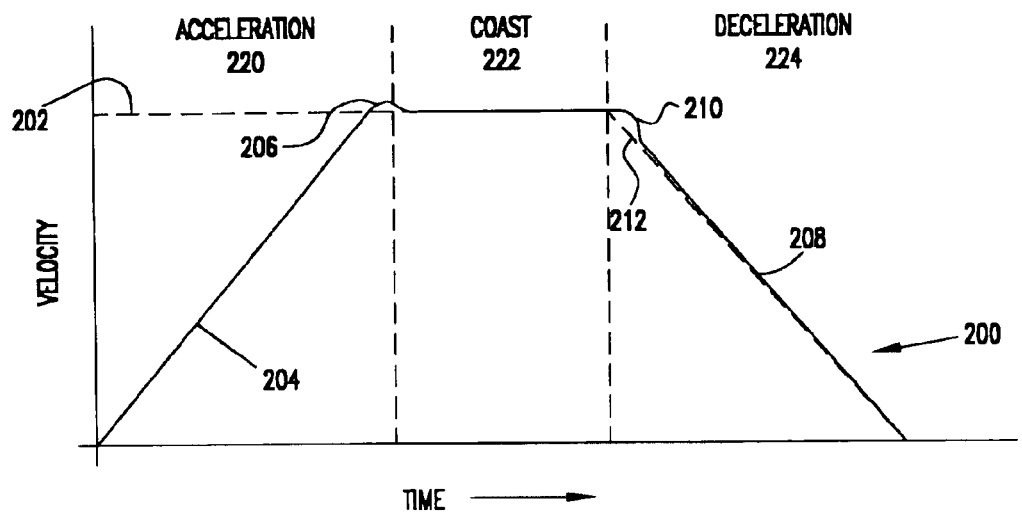
FIG. 2 is a velocity diagram.

FIG. 2 illustrates a velocity-time profile 200 for a long seek operation by a disc drive, such as drive 100 (FIG. 1). Disc drive 100 has a specified design maximum velocity 202, which is a maximum velocity at which the disc drive is permitted to move the actuator arm 110 (also FIG. 1) during a seek operation. A typical design maximum velocity is about 100 inches/sec (254 cm/sec), so an actuator operated at design maximum velocity will require 0.01 seconds to radially travel a distance of 1.0 inch (2.5 cm) across the confronting disc surface. Typically, design maximum velocity 202 is selected during the design phase for the disc drive and is the same for all disc drives of a particular model or design. During the acceleration phase 220 of a long seek, the actual velocity 204 of the actuator arm increases from zero (at the initial track) to the design maximum velocity 202. (Sometimes overshoot 206 of the maximum velocity occurs at the transition from acceleration phase 220 to coast phase 222.) The actuator arm travels at the design maximum velocity 202 through coast phase 222 and the velocity reduces to zero, commencing at some intermediate track crossing and seek time, following velocity profile 208 through deceleration phase 224. Again, some delay 210 may occur at the transition from the coast phase to the deceleration phase.

Figure 3:
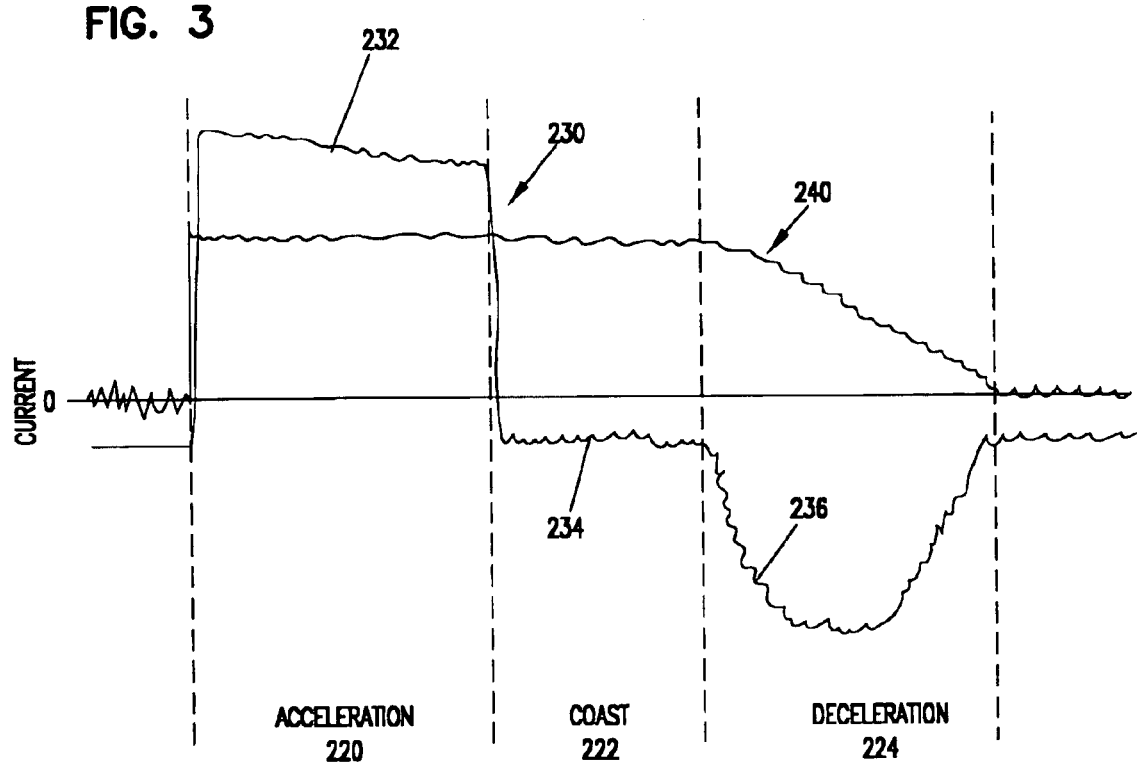
FIG. 3 illustrates current waveforms, demonstrating performance of a disc drive during a long seek.

FIG. 3 illustrates the current 230 to voice coil motor (VCM) 118 (FIG. 1) to move the actuator arm through its seek operation and the position error signal 240 representing the position error of the head 111 to the destination track. As shown by curve 232, the VCM current rises sharply to a maximum actuator current during acceleration phase 220, drops to a minimal current level 234 through coast phase 222 to maintain the constant design maximum velocity, and then follows a profile 236 based on values from a deceleration position-velocity (PV) table to follow the demand velocity profile 212 through deceleration phase 224 to the destination track. At or near the destination track, the servo controller switches from track seek mode to track follow mode to operate the actuator to maintain the head at track center.

As shown in FIG. 2, and ignoring overshoot 206 and delay 210, the actual velocity 208 closely follows the demand velocity profile 212, shown in dashed lines in the figure, through the coast and deceleration phases 222 and 224. Consequently, little noise is introduced to the drive due to the VCM current during these phases. However, during the acceleration phase 220, the large difference between the actual velocity 204 and the demand velocity 202 generates a large velocity error, which in turn produces a rapid change in VCM current. This rapid change in VCM current has a fast rise time and is therefore acoustically noisy.

Figure 4:
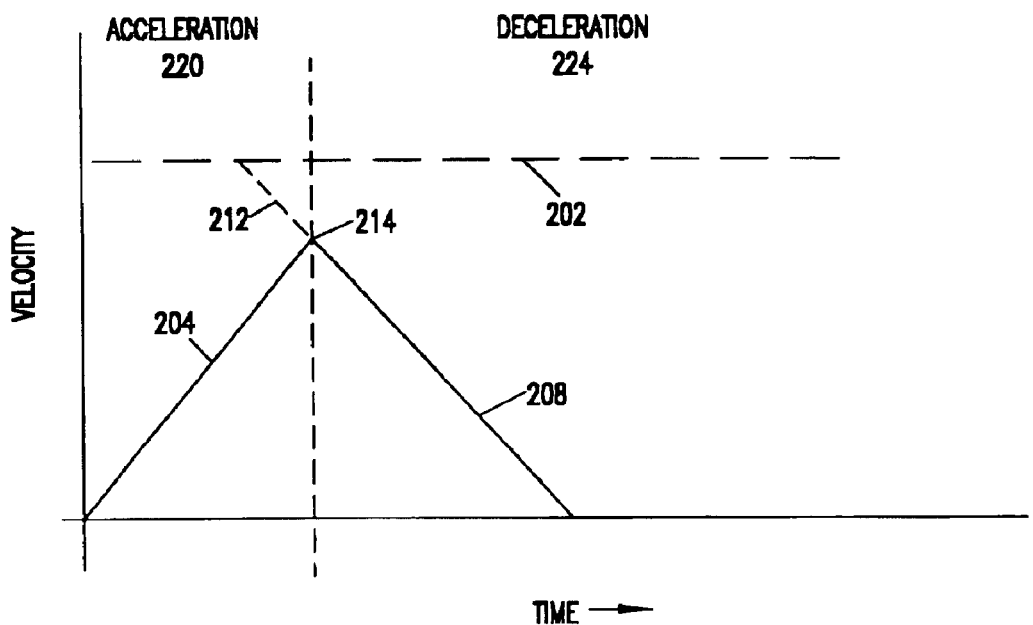
FIG. 4 is a velocity diagram demonstrating an ideal performance of a disc drive during a short seek.

FIG. 4 illustrates a velocity profile 240 for a short seek operation by a disc drive. In this case, the deceleration phase 224 begins before the actual velocity 204 can reach the design maximum velocity 202 during the acceleration phase 220. Consequently, when the actual velocity 204 reaches the demand velocity 212 of the deceleration phase, the velocity controller switches over from the acceleration phase 220 to the deceleration phase 224 and the actual velocity 208 follows the demand velocity 212 to zero since the velocity error is now small. Ideally, the actual velocity of the acceleration phase exactly matches the demand velocity of the deceleration phase at the cross-over point 214, resulting in a minimal jerk in the VCM current (i.e., dI/dt is minimal).

The demand velocity 212 is established by the selected position-velocity (PV) lookup table for the seek. Depending on the seek length, a PV table will be chosen from a number of different PV lookup tables stored in memory.

In the above-referenced Cheetah drive, a PV table is created for the acceleration phase of a seek based on a shape of the actuator motor current that is acoustically quiet. The acoustically quiet current profile is modeled in time domain taking into account system delays, motor torque constant, motor back electromagnetic force (Bemf), and other operating parameters of the actuator system. The resulting acceleration profile is integrated to produce a velocity trajectory and double integrated to produce a position trajectory. The position-velocity lookup table for the acceleration phase is created based on the resulting position and velocity trajectories. The acceleration phase lookup table is normalized so that the peak seek distance (equal to the maximum number of tracks crossed during acceleration for a long seek) and the peak demand velocity (equal to the design maximum velocity for the disc drive) are each 1.0.

A demand velocity multiplier, herein called a Vscale factor, and a distance multiplier, herein called an Xscale factor, are derived and used to scale the acceleration lookup table. Each factor is greater than zero and less than or equal to unity: $0 < Vscale \leq 1$ and $0 < Xscale \leq 1$. The value of Vscale is selected such that if Vscale=1, the actuator will reach the design maximum velocity for the disc drive. The value of Xscale is selected such that Xscale=1 represents the maximum number of track crossings during an acceleration phase. Stated another way, Xscale=1 represents the number of track crossings during acceleration to the design maximum velocity (i.e., when Vscale=1). If Xscale=1 represents 10,000 track crossings and an acceleration phase is needed for only 5000 crossings, the Xscale factor will be 0.5.

The Cheetah drive employs a plurality of deceleration PV lookup tables, each defining demand velocity profiles over distance-to-go for various ranges of track seeks. For a given seek operation, a deceleration table is selected based on the seek length, namely the number of tracks to be crossed during the seek operation. The deceleration range, in number of tracks to be crossed, is identified from the selected table; the number of tracks to be crossed during the acceleration phase is the difference between the total seek length and the deceleration phase seek length. The Xscale factor is calculated from the acceleration phase seek length. The Vscale factor for the acceleration phase is based on the starting velocity identified by the selected deceleration table. As a result, the ending velocity of the acceleration phase is selected to closely match the beginning velocity of the deceleration phase.

Figure 5:
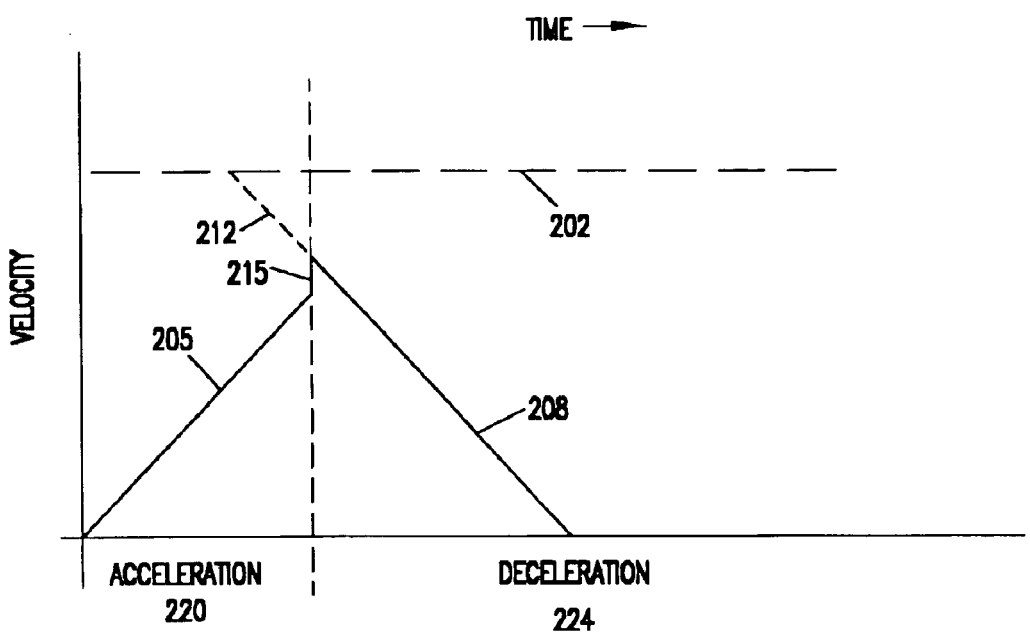
FIG. 5 is a velocity diagram, as in FIG. 4, demonstrating a mismatch between demand velocities of acceleration and deceleration phases of a short seek in a prior disc drive.

The problem of the referenced Cheetah drive is that the scaled peak (ending) velocity of the acceleration phase did not always match the peak (starting) velocity of the deceleration phase on seeks that contained no coast phase. Consequently, a velocity error occurred at cross-over 214 (FIG. 4), generating noise in the disc drive as the actuator current to the VCM changed to compensate for the error. For example, as shown in FIG. 5, if the scaled peak demand velocity 205 of the acceleration phase does not match the peak demand velocity 208 at the start of the deceleration phase 224, a jerk occurs in the VCM current due to the non-matching peak velocities as shown at 215 in FIG. 5. The disc drive was therefore forced into having a coast phase during the seek to overcome these limitations. The present invention is directed to a correction technique to create a better match between the peak velocities of the acceleration and deceleration phases. More particularly, the present invention provides a technique to scale an approximation of the acceleration phase demand velocity profile and successively calculate an acceleration phase demand velocity based on the distance traveled by the head during the seek and the scaled acceleration demand velocity profile. Each deceleration phase position-velocity profile defines a demand velocity that extends from the design maximum velocity to zero, based on the distance-to-go for the head. The smaller of the two demand velocities for any given head position is selected to operate the actuator motor. More particularly, when the acceleration phase demand velocity increases to be greater than the deceleration phase demand velocity, a seamless hand-off is made between the acceleration and deceleration phases, with minimal noise.

One goal of the present invention is to provide an acoustically quiet acceleration curve so that the rate of change of VCM current (dI/dt) is substantially constant and current jerks are minimal. FIGS. 6–10 are waveforms illustrating effects of an acoustically quiet current profile for the acceleration portion of a seek. More particularly, FIG. 6 illustrates a current profile 300 having attack 302, hold 304 and decay 306 current portions. Current profile 300 generates a velocity profile 310 shown in FIG. 7, similar to the velocity profiles of the acceleration phases shown in FIGS. 2, 4 and 5. However, as shown in FIG. 8, current profile 300 produces minimal jerk (changes in dI/dt). Instead, a large jerk 320 is generated at the beginning of the acceleration phase, quickly diminishing to near zero and remaining near zero at 322 during the hold portion of current profile 300. A small negative jerk 324 is introduced during the decay portion 306 of current profile 300. FIG. 9 illustrates the position profile 330 over time of the head as it moves across about 8000 tracks. FIG. 10 illustrates the position-velocity profile for the acceleration phase.

Figure 11:
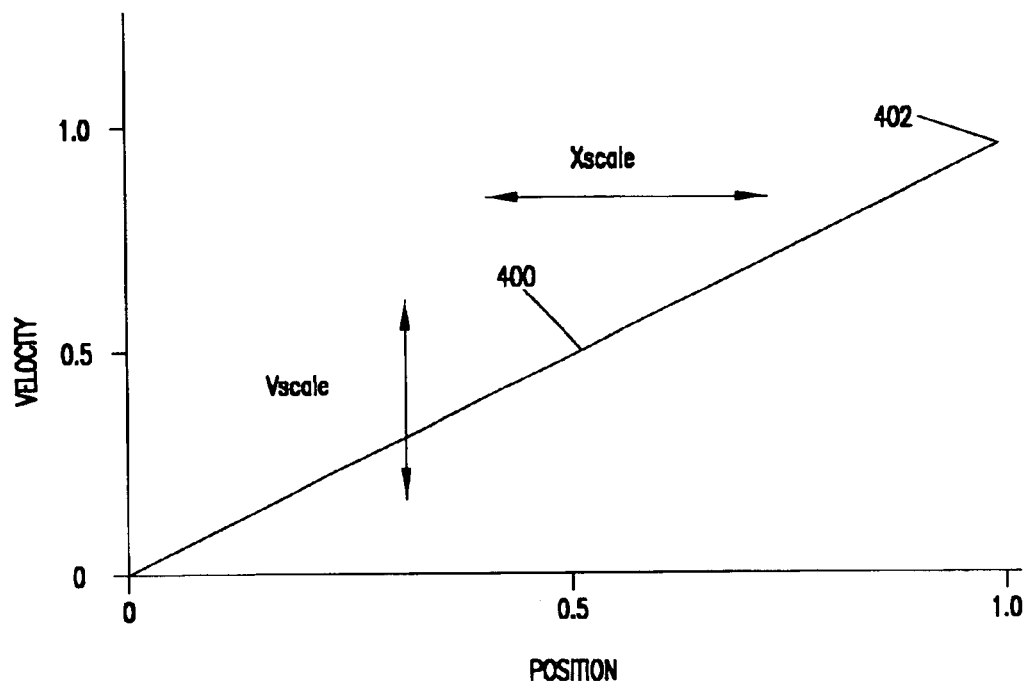
FIG. 11 illustrates how scaling functions according to the present invention affect a position-velocity profile.
Figure 12:
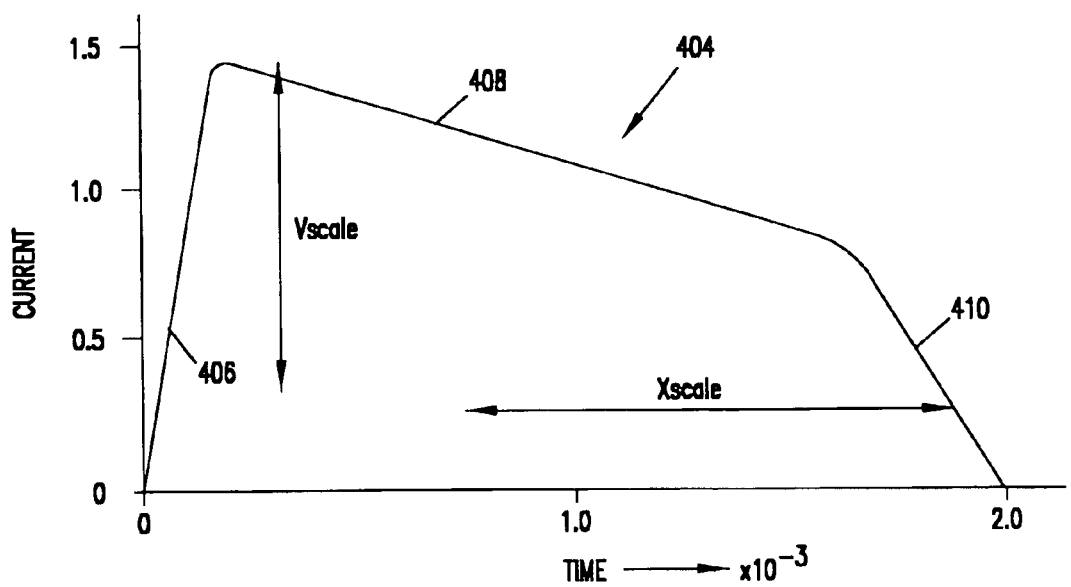
FIG. 12 illustrates how the scaling functions affect the ideal current profile.

In accordance with the present invention, an ideal current profile, as in FIG. 6, is selected for an acceleration phase. As shown in FIG. 11, an acceleration phase position-velocity (PV) profile 400 is provided having normalized maximum velocity and distance traveled for the acceleration phase. The distance traveled is normalized at 1.0 when the curve of profile 400 reaches maximum design velocity at 402 for the disc drive (also normalized at 1.0). FIG. 12 illustrates the ideal current profile 404 for the actuator motor during the acceleration phase to produce PV profile 400 of FIG. 11. In FIG. 12, ideal current profile 404 is represented in three portions, an attack portion 406, a hold portion 408 and a decay portion 410. The current values of attack and decay portions 406 and 410 vary with time in accordance with respective sine functions, and the current value of hold portion 408 varies linearly with time. Those skilled in the art will recognize that the idealization of current profile 404 may be modeled by any number of functions, and that the three functions stated are given by way of example and not of limitation.

The normalized PV profile 400 (FIG. 11) is adjusted based on selected Vscale and Xscale factors for the seek operation. More particularly, the demand velocity is based on the normalized maximum demand velocity scaled by the Vscale factor; the acceleration seek distance is based on the normalized maximum acceleration seek distance scaled by the selected Xscale factor. The Xscale and Vscale factors are calculated for the PV profile using a quadratic or second order computation. More particularly, a quadratic computation of the inverse of the Xscale factor is calculated as $$\frac{1}{Xscale} = A_X(SeekLength)^2 + B_X(SeekLength) + C_X. \quad (1)$$

Thus, $$Xscale = \frac{1}{A_X(SeekLength)^2 + B_X(SeekLength) + C_X},$$

and the Vscale factor is calculated as $$Vscale = A_V(SeekLength)^2 + B_V(SeekLength) + C_V, \quad (2)$$

where SeekLength is the length of the seek in number of track crossings and $A_X$, $B_X$ and $C_X$, and $A_V$, $B_V$ and $C_V$ are coefficients based on ranges of seek lengths. The Xscale factor is calculated by inverting the result of equation (1). The $A_X$, $B_X$, $C_X$, $A_V$, $B_V$ and $C_V$ coefficients are derived empirically for each range of seek lengths. For example, a range of seek lengths between 101 and 400 tracks may have one set of constants, a range of seek lengths between 401 and 1000 tracks may have a second set of constants, and so on to a maximum seek length depending of the configuration of the disc drive. In one embodiment, for a seek length in the range between about 10,000 and 18,000 tracks, the following coefficients might be used:

$A_X = -3.269e^{-10}$ $B_X = 2.515e^{-5}$ $C_X = 4.763e^{-2}$ $A_V = -2.651e^{-3}$ $B_V = 1.423$ $C_V = 4.253e^3$

Figure 13:
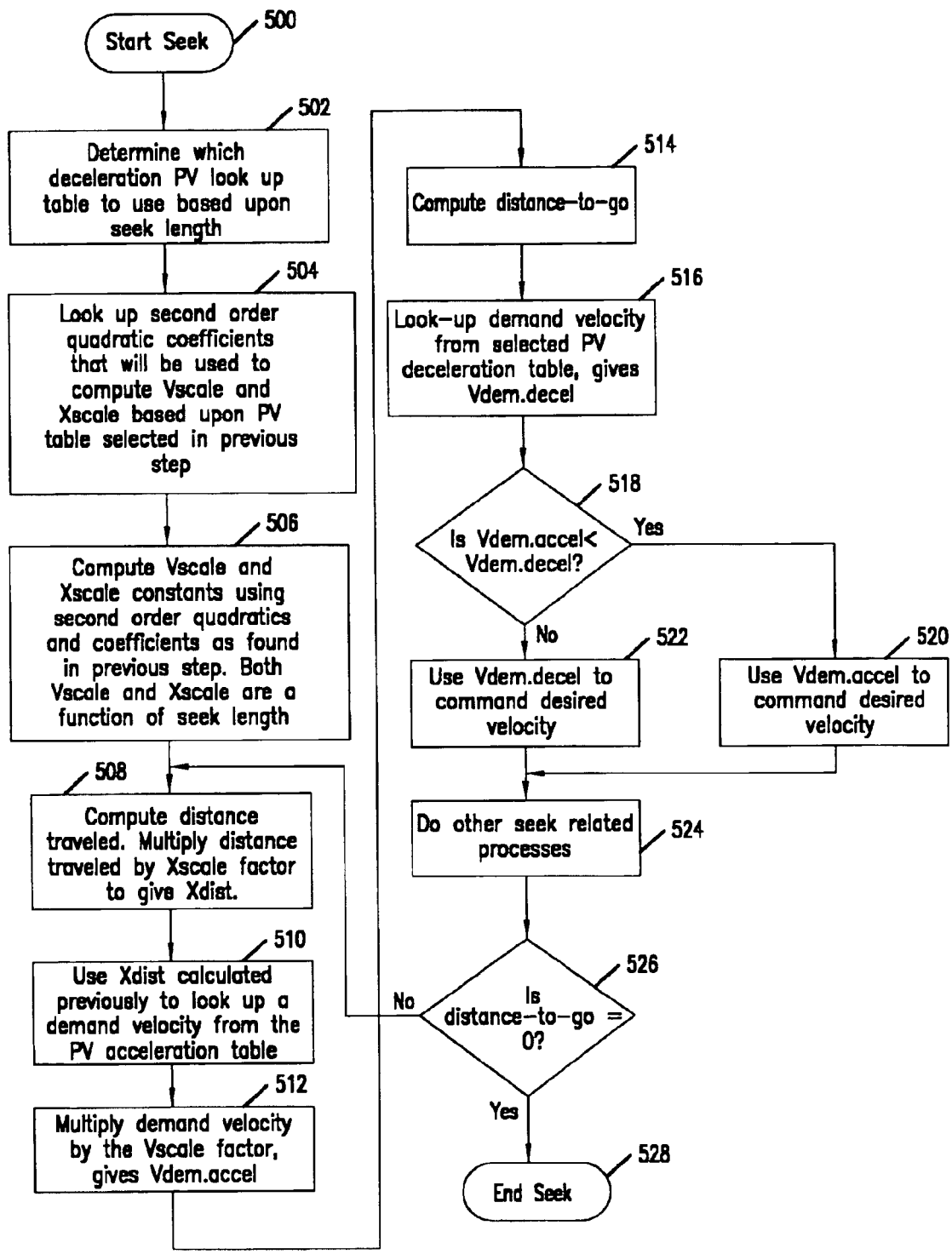
FIG. 13 is a flow chart illustrating a process of a seek operation according to a first embodiment of the present invention.

The seek operation is conducted by selecting a deceleration profile based on the seek length. The normalized acceleration phase position-velocity profile is adjusted based on calculated Xscale and Vscale factors. The acceleration phase demand velocity is successively calculated based on the distance traveled during the seek. Each iteration of the acceleration demand velocity is compared to the demand velocity for the corresponding distance of the deceleration phase. FIG. 13 is a flow chart illustrating the steps performed in carrying out a seek operation according to an embodiment of the present invention.

The seek commences at step 500 with a command from the disc drive controller, such as the circuitry on circuit board 128 (FIG. 1). At step 502, the length of the seek operation is identified from the start track and the destination, or end, track required by the command. A deceleration position-velocity profile is selected based on the identified seek length. At step 504, the second order quadratic coefficients $A_X$, $B_X$, $C_X$, $A_V$, $B_V$ and $C_V$ are identified from one or more lookup tables. More particularly, the coefficients are selected for the range of seek lengths that includes the identified seek length for the seek operation. The Xscale and Vscale constants are calculated at step 506 using equations (1) and (2) previously described.

At step 508, the current track position of the head is identified and the distance traveled is calculated based on the start track and the current track. The distance traveled is multiplied by the Xscale factor to give a calculated Xdist value. This is equivalent to identifying a position between 0 and 1 on the PV profile illustrated in FIG. 11. At step 510, the calculated Xdist value is used to identify a demand velocity from the acceleration phase position-velocity table (represented by the curve of FIG. 11), and hence the current required (represented by the curve of FIG. 12). At step 512, the identified demand velocity is multiplied by the Vscale factor resulting in an adjusted demand velocity value for the acceleration phase, herein called "Vdem.accel". Hence, Vdem.accel is the equivalent scaled demand velocity for the position Xdist on the PV profile of FIG. 11.

At step 514, a distance-to-go value is calculated based on the destination (end) track and the current track position of the head. At step 516 the demand velocity (Vdem.decel) is identified for the deceleration position-velocity profile selected at step 502 based on the distance to go.

At step 518, the adjusted demand velocity for the acceleration phase (Vdem.accel) is compared to the demand velocity for the deceleration phase (Vdem.decel) for the current position of the head between the start and destination tracks. If Vdem.accel is smaller than Vdem.decel, Vdem.accel is selected at step 520 and the VCM current (FIG. 6) is adjusted to the required demand velocity (FIG. 7). If Vdem.accel is greater than Vdem.decel, Vdem.decel is selected at step 522 and the VCM current follows the deceleration profile.

Figure 14:
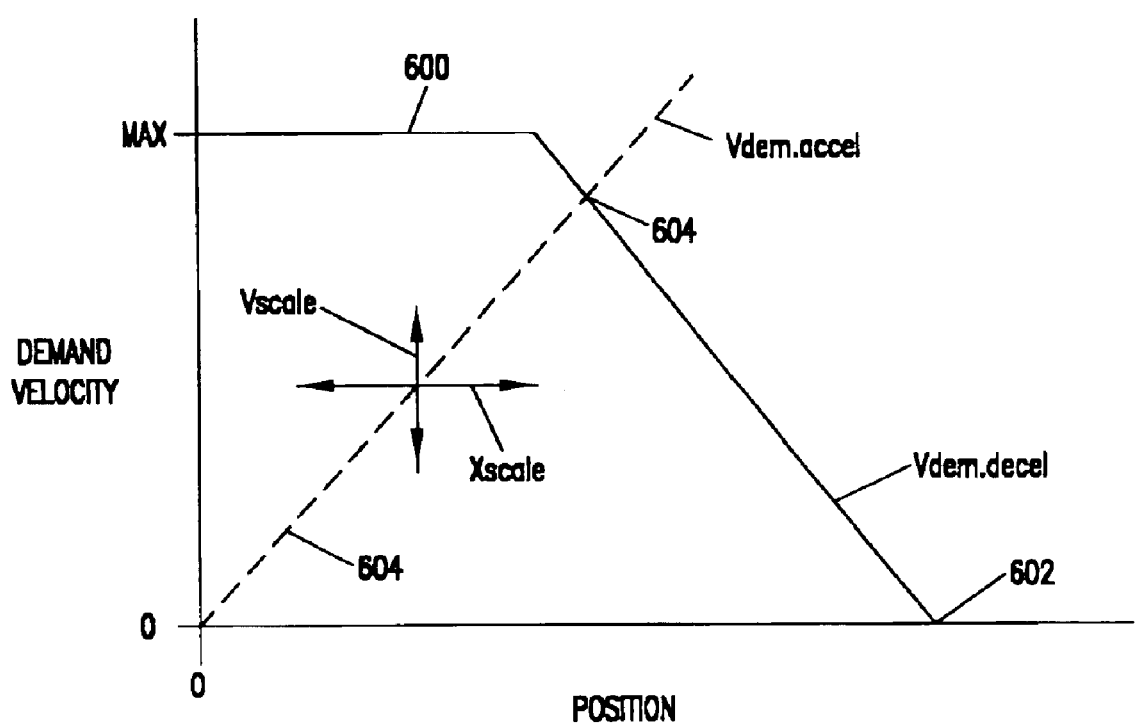
FIG. 14 is a position-velocity profile demonstrating application of the process shown in FIG. 13.

FIG. 14 is a position-velocity profile for a selected deceleration profile, Vdem.decel, and a superimposed acceleration profile, Vdem.accel that is adjusted by the Xscale and Vscale factors. FIG. 14 illustrates the effect of the process of FIG. 13 on a short disc drive seek operation (having no coast phase between the acceleration and deceleration phases). The deceleration demand velocity, Vdem.decel, commences at a maximum demand velocity 600 for the disc drive, and diminishes to zero at destination track 602 in accordance with the selected deceleration velocity profile. The acceleration demand velocity, Vdem.accel, commences at zero and increases in accordance with the normalized acceleration velocity profile as adjusted by the Xscale and Vscale factors. The two velocity profiles, Vdem.accel and Vdem.decel, cross over at point 604. During the acceleration phase, Vdem.accel will be smaller than the projected demand velocity of the deceleration phase (Vdem.decel). Consequently, before reaching cross-over point 604, Vdem.accel is smaller than Vdem.decel and the acceleration profile is employed. After reaching cross-over point 604, the projected demand velocity for the acceleration phase (Vdem.accel) will be greater than the demand velocity of the deceleration phase (Vdem.decel), so the deceleration profile is employed. Consequently, at the cross-over point 604, Vdem.accel will nearly equal Vdem.decel, and the hand-off from one profile to the other will be with minimal noise.

Returning to FIG. 13, following selection of the demand velocity Vdem.accel or Vdem.decel, if any other seek operations are to be performed, they are performed at step 524. At step 526, if the distance-to-go value that had been computed at step 514 is equal to zero, the seek ends at step 528 with the head at the destination track, and the servo operation switches to the track follow mode, as well known in the art. If the distance-to-go value is not equal to zero, the process loops back to step 508 to compute a new distance-traveled and a new value for Vdem.accel is calculated and compared to Vdem.decel at steps 510–518, as explained above. The process continues through several iterations for successive Xdist (and distance-to-go) values until the distance-to-go equals zero and the destination track is reached.

The process easily handles short seek operations, where no coast phase appears between the acceleration and deceleration phases. Consequently, the handoff or cross-over between the acceleration and deceleration phases is accomplished with a near match between the maximum demand velocities of the acceleration and deceleration phases, resulting in a smooth cross-over with minimal noise. The process also handles long seek operations (where a coast phase appears between the acceleration and deceleration phases), in which case the values of Vscale and Xscale are calculated as 1.0.

Figure 15:
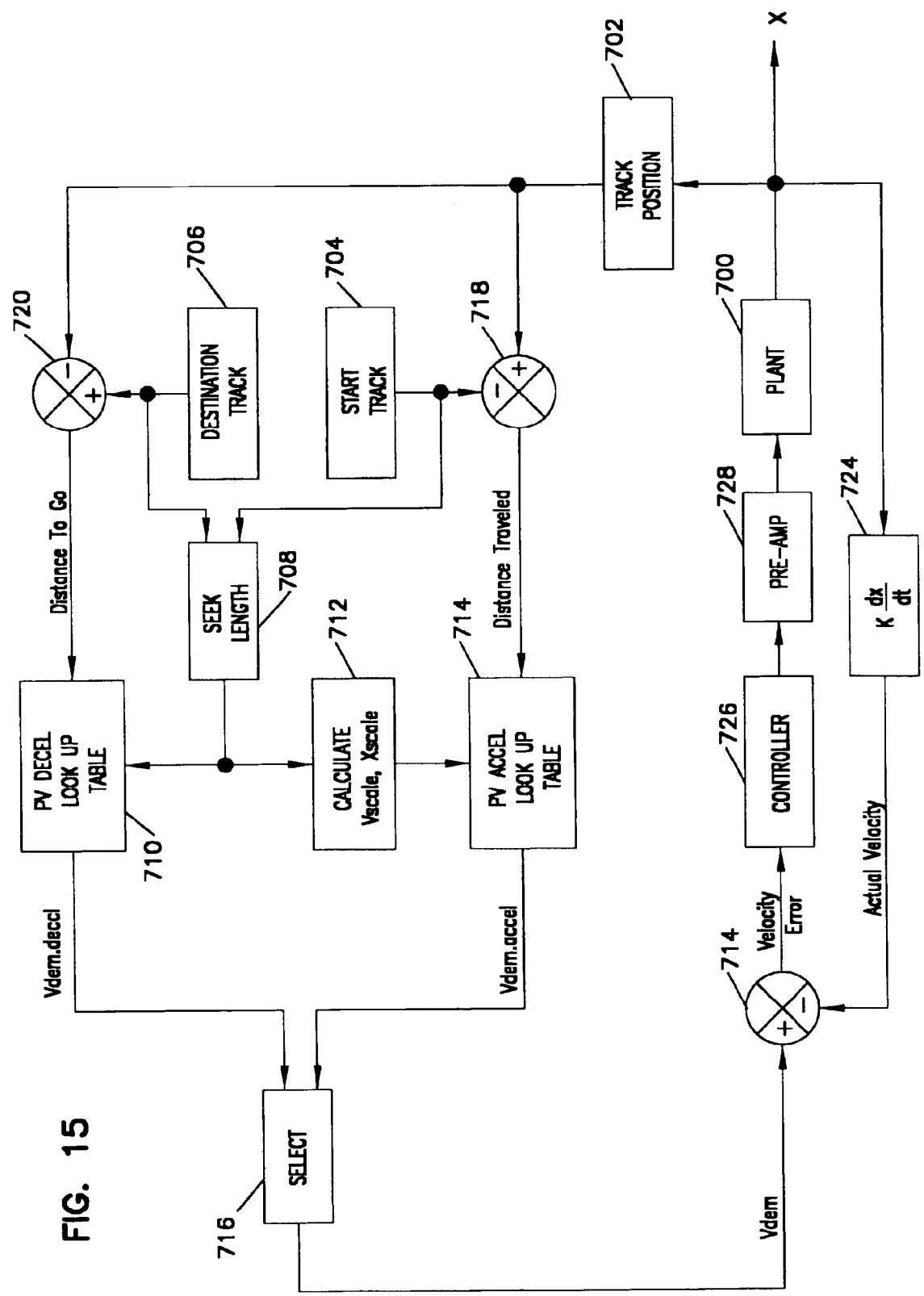
FIG. 15 is a block logic diagram of a servo system according to a second embodiment of the present invention for carrying out the process of FIG. 13.

FIG. 15 is a block diagram of a closed-loop servo logic for carrying out a seek operation according to an embodiment of the present invention. The disc drive is represented by plant 700. More particularly, plant 700 represents the actuator system and head position detection, including the actuator assembly, recording disc and read head of the disc drive, to provide a representation 702 of the current position of the read head relative to tracks on the confronting disc. Upon receipt of a seek command, the start track 704 is identified as the then-current track position of the head, and the destination track 706 is identified from the command. Calculator 708 calculates the seek length based on the difference between the track identifications of the start and destination tracks. A representation of the seek length is supplied by calculator 708 to storage apparatus 710 containing a plurality of position-velocity lookup tables for the deceleration phase. More particularly, storage apparatus 710 may contain a lookup table defining a position-velocity profile for each of a plurality of ranges of seek lengths. Storage apparatus 710 is responsive to the representation of the seek length from calculator 708 to select the deceleration position-velocity table for the range that includes the seek length. The seek length representation is also applied to calculator 712 to calculate values of Vscale and Xscale, which in turn are applied to calculator and storage apparatus 714. The storage apparatus portion of calculator and storage apparatus 714 contains a normalized position-velocity lookup table for the acceleration phase of a seek operation. The tables in storage apparatus 710, 714 provide representations of the deceleration and acceleration demand velocities to select 716 based on distance-to-go and distance-traveled representations from summing devices 718 and 720.

A seek operation commences with a seek command identifying the destination track of the seek. At the start of the seek operation, the track position at 702 is the same as the start track identification at 704. Calculator 708 calculates the seek length and supplies the seek length representation to storage apparatus 710 and calculator 712. Storage apparatus 710 is responsive to the seek length to select one of the deceleration phase position-velocity tables therein.

Initially, summing device 718 provides a distance-traveled representation of zero to calculator and storage apparatus 714, and summing device 720 provides a distance-to-go representation equal to the seek length to storage apparatus 710. Storage apparatus 710 is responsive to the distance-to-go representation to select a deceleration phase demand velocity, Vdem.decel, from the selected deceleration position-velocity table based on the distance-to-go representation. At the start of the seek operation, with a distance-to-go equal to the seek length, storage apparatus 710 supplies a maximum demand velocity representation, Vdem.decel, to select 716.

Calculator and storage apparatus 714 is responsive to the distance traveled and to the value of Xscale calculated by calculator 712, to calculate an Xdist value based on the distance-traveled value multiplied by the value of Xscale. The value of Xdist is applied to the normalized acceleration position-velocity table to select a demand velocity from the table. The selected demand velocity is multiplied by the value of Vscale from calculator 712 to derive the acceleration phase demand velocity, Vdem.accel. At the start of the seek operation, with a distance-traveled equal to zero, calculator and storage apparatus 714 supplies a minimum value representation of Vdem.accel to select 716. Select 716 selects the smaller of Vdem.accel and Vdem.decel (which is Vdem.accel in this case) and applies it as Vdem to summing device 722.

Assuming the actuator of plant 700 has not yet commenced moving the head toward the destination track, the actual velocity of movement of the head calculated at 724 is zero. Summing device 722 calculates a velocity error based on the difference between the demand velocity Vdem and the actual velocity (zero), and applies the velocity error representation to servo controller 726, to supply a current to the actuator of plant 700 through preamplifier 728. The current supplied to plant 700 drives the actuator to move the head toward the destination track. At some later time, based on the sample clock rate of servo controller 726, a new track position is identified at 702 and new distance-traveled and distance-to-go values are calculated by summing devices 718 and 720 and applied to the respective deceleration and acceleration phase position-velocity tables in storage apparatus 710, 714 to identify new demand velocities Vdem.decel and Vdem.accel. The smaller demand velocity is selected by select 716, summed to the actual velocity to derive a velocity error by summing device 722 to select a new drive current to plant 700.

The process continues as described in connection with FIG. 13 until the track position identified at 702 is the same as the destination track at 706 and the distance-to-go value to the deceleration table in storage apparatus 710 is zero. At this point, seek operation is completed and the controller is operated to the track following mode as well known in the art.

A typical seek operation will require about $2 \times 10^{-3}$ seconds, depending on the length of the seek. If servo controller 726 has a sample clock rate of 48 KHz to 64 KHz, the demand velocity will be re-calculated as many as one hundred times during a typical search, and several hundred times during long searches. Consequently, the actual seek velocity will closely follow the demand velocity, and the handoff at the cross-over between the acceleration and deceleration phases is nearly seamless.

Thus, one embodiment of the invention provides a process of performing a seek operation in a servo system which includes identifying a seek length and selecting (step 502) a deceleration position-velocity profile based on the seek length. Successive demand velocity values are selected during the seek operation by, for each selection, identifying a distance-to-go (step 514) and a distance-traveled (step 508) of the seek length, calculating an acceleration demand velocity value (step 512) based on the identified distance-traveled and an acceleration position-velocity profile, identifying a deceleration demand velocity value (step 516) based on the identified distance-to-go and the selected deceleration position-velocity profile, and selecting either the acceleration demand velocity value or the deceleration demand velocity value (step 518).

In one embodiment of the process, the acceleration demand velocity value is calculated by calculating first and second scaling factors based on the seek length (step 506), adjusting the distance traveled by the first scaling factor (step 508), identifying a velocity value of a normalized position-velocity profile for the acceleration phase based on the adjusted distance traveled (step 510), and adjusting the identified velocity value based on the second scaling factor (step 512).

In another embodiment, servo apparatus includes an actuator (118) to move a head (111) between a start track and a destination track in response to a seek command. A seek length identifier (708) identifies a seek length between the start and destination tracks. A calculator (712) is responsive to the identified seek length (708) to calculate an adjustment factor (Xscale and Vscale). Position detection apparatus (702) identifies a current position of the head. First storage apparatus (710) stores a plurality of deceleration position-velocity tables each correlating head position to seek velocity through respective deceleration phases of seek operations. The first storage apparatus (710) is responsive to the identified seek length (708) to select a deceleration position-velocity table, and is responsive to the identified current position (702) of the head to select a representation of a first demand velocity (Vdem.decel) from the selected deceleration position-velocity table. Second storage apparatus (714) stores an acceleration position-velocity table correlating head position to seek velocity through an acceleration phase of seek operations. The second storage device (714) is responsive to the identified current position (702) of the head and to the adjustment factor (Xscale and Vscale) to provide a representation of a second demand velocity (Vdem.accel). A selector (716) is responsive to the first (710) and second (714) storage apparatus to select the representation of either the first (Vdem.decel) or second (Vdem.accel) demand velocity.

Although the present invention has been described with reference to a magnetic disc drive, those skilled in the art will recognize that the present invention may be practiced with other system modifications, including but not limited to servo positioning systems, such as used in robotic systems, as well as systems employing other storage technologies, such as optical disc drives.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. More particularly, the values for the constants for the quadratic equations are for one exemplary disc drive, and might vary depending on the particular application for the seek technique. Moreover, while specific quadratic equations are employed to approximate the ideal current profile shown in FIG. 6, other equations with a greater number of terms and constants may be used for more accurate approximation of the ideal current profile, while maintaining substantially the same functionality of the present invention and without departing from the scope and spirit of the present invention. Thus, while the invention is described in connection with simple quadratic equations to approximate the ideal acceleration current profile, the seek process of the present invention might be accomplished using more complex equations for better approximation of the ideal current profile. It should be recognized that a more complex approximation of the ideal acceleration current profile will result in larger storage requirements for the constants and additional processing time. I have found that the simple quadratic equations, like those described herein, are quite adequate for most cases. In addition, although the invention is described herein is directed to track seek technology for disc storage devices, it will be appreciated by those skilled in the art that the teachings of the present invention can be applied to other servo functions, including for other types of apparatus, without departing from the scope and spirit of the invention.

What is claimed is:

1. A process of operating a servo system to move a device between positions comprising:

accelerating the device during an acceleration phase;

decelerating the device during a deceleration phase; and matching maximum demand velocities of the acceleration and deceleration phases to thereby smooth a crossover between acceleration and deceleration of the device.

2. The process of claim 1 further comprising:

a) identifying a seek length based on a distance between start and destination positions;

b) selecting a representation of a deceleration position-velocity profile based on the seek length;

c) identifying a position of the device between the start and destination positions;

d) calculating a representation of an acceleration demand velocity for the device for the identified position based on a representation of an acceleration position-velocity profile;

e) identifying a representation of a deceleration demand velocity for the device for the identified position based on the selected representation of a deceleration position-velocity profile;

f) selecting the identified representation of either the acceleration demand velocity or the deceleration demand velocity; and g) operating the servo system based on the selected representation.

3. The process of claim 2, wherein step (d) is performed by steps of:

d1) calculating first and second scaling factors based on the seek length, d2) adjusting the identified position by the first scaling factor, d3) identifying a representation of a demand velocity of a normalized position-velocity profile for the acceleration phase based on the adjusted position, and d4) adjusting the identified representation of the demand velocity based on the second scaling factor.

4. The process of claim 3, wherein the first and second scaling factors are calculated based on quadratic equations.

5. The process of claim 3, wherein the first scaling factor is based on $$\frac{1}{A_X(SeekLength)^2 + B_X(SeekLength) + C_X},$$

and
the second scaling factor is based on $$A_V(SeekLength)^2 + B_V(SeekLength) + C_V, \text{ where}$$

$A_X$, $B_X$, $C_X$, $A_V$, $B_V$ and $C_V$ are coefficients based on the seek length, and SeekLength is the seek length.

6. The process of claim 2, wherein step (d) is performed by scaling identified positions of a representation of a normalized position-velocity profile based on a first scaling factor and by scaling velocities of the representation of the normalized position-velocity profile based on a second scaling factor.

7. The process of claim 2, further including g) repeating steps (c) through (f) for a plurality of positions between the start and destination positions.

8. The process of claim 2, wherein step (f) is performed by steps of:

f1) comparing the representations of the acceleration demand velocity and the deceleration demand velocity, and f2) selecting the smaller of the acceleration demand velocity representation and the deceleration demand velocity representation.

9. The process of claim 1 wherein the matching comprises adjusting at least one of the acceleration and deceleration of the device.

10. The process of claim 9 wherein the adjusting is based upon a quadratic equation.

11. A process of operating a disc drive servo system in a seek mode, the process comprising:

obtaining representations of an acceleration position-velocity profile for a head and a deceleration position-velocity profile for the head;

matching maximum demand velocities of the representations of deceleration and acceleration position-velocity profiles; and positioning the head on a storage medium in accordance with the matched maximum demand velocities.

12. The process of claim 11 further comprising:

a) identifying a seek length based on a distance between start and destination tracks on the storage medium;

b) selecting the representation of a deceleration position-velocity profile based on the seek length;

c) identifying a track position of the head between the start and destination tracks;

d) calculating a representation of an acceleration demand velocity for the head for the identified track position based on the representation of the acceleration position-velocity profile;

e) identifying a representation of a deceleration demand velocity for the head for the identified track position based on the selected representation of a deceleration position-velocity profile;

f) operating the servo system based on the representation of one of the acceleration demand velocity or the deceleration demand velocity; and g) repeating steps (c) through (f) for a plurality of tracks between the start and destination tracks.

13. The process of claim 12, wherein step (d) is performed by steps of:

d1) calculating first and second scaling factors based on the seek length, d2) adjusting the identified track position by the first scaling factor, d3) identifying a representation of a demand velocity of a normalized position-velocity profile for the acceleration phase based on the adjusted track position, and d4) adjusting the identified representation of the demand velocity based on the second scaling factor.

14. The process of claim 13, wherein the first and second scaling factors are calculated based on quadratic equations.

15. The process of claim 13, wherein the first scaling factor is based on $$\frac{1}{A_X(SeekLength)^2 + B_X(SeekLength) + C_X},$$

and
the second scaling factor is based on $$A_V(SeekLength)^2 + B_V(SeekLength) + C_V, \text{ where}$$

$A_X$, $B_X$, $C_X$, $A_V$, $B_V$ and $C_V$ are coefficients based on the seek length, and SeekLength is the seek length.

16. The process of claim 12, wherein step (d) is performed by scaling identified positions of a representation of a normalized position-velocity profile based on a first scaling factor and by scaling velocities of the representation of the normalized position-velocity profile based on a second scaling factor.

17. The process of claim 12, wherein step (f) is performed by steps of:

f1) selecting the smaller of the acceleration demand velocity or the deceleration demand velocity, and f2) operating the servo system based on the representation of the selected demand velocity.

18. Servo apparatus to move a head in a disc drive, comprising:

an actuator responsive to a representation of a demand velocity to move the between tracks; and acceleration/deceleration circuitry configured to provide an acceleration demand position-velocity profile and a deceleration demand position-velocity profile to the actuator in which maximum demand velocities of the profiles are matched to thereby smooth a crossover between acceleration and deceleration of the head.

19. The servo apparatus of claim 18 further comprising:

a seek length identifier identifying a seek length between start and destination tracks;

a calculator responsive to the identified seek length for calculating a scaling factor;

position detection apparatus for identifying a position of the head between the start and destination tracks;

first storage apparatus responsive to the identified seek length and to the identified track position of the head to select a representation of a first demand velocity;

second storage apparatus responsive to the identified track position of the head and to the scaling factor to provide a representation of a second demand velocity; and a selector responsive to the first and second storage apparatus to select the representation of either the first or second demand velocity.

20. The servo apparatus of claim 19, wherein the calculator is responsive to the identified seek length to calculate first and second scaling factors, and the second storage apparatus stores a normalized acceleration position-velocity table and is responsive to the first scaling factor to scale the identified track position, the second storage apparatus being responsive to the scaled track position to provide the representation of the second demand velocity based on a normalized demand velocity for the scaled track position and the second scaling factor.

21. The servo apparatus of claim 20, wherein the calculator calculates the first and second scaling factors based on quadratic equations.

22. The servo apparatus of claim 20, wherein the calculator calculates the first scaling factor based on $$\frac{1}{A_X(SeekLength)^2 + B_X(SeekLength) + C_X},$$

and
calculates the second scaling factor based on $A_V(SeekLength)^2 + B_V(SeekLength) + C_V$, where $A_X$, $B_X$, $C_X$, $A_V$, $B_V$ and $C_V$ are coefficients based on the seek length, and SeekLength is the seek length.

23. The servo apparatus of claim 19, wherein the calculator calculates first and second scaling factors and the second storage apparatus scales the identified track position of the head to a representation of a normalized position-velocity profile based on the first scaling factor and scales corresponding velocities of the representation of the normalized position-velocity profile based on the second scaling factor.

24. The servo apparatus of claim 19, wherein the position detection apparatus identifies plural track positions of the head as the head moves from its start to its destination track, and, for each track position, the first storage apparatus contains a plurality of deceleration position-velocity tables each correlating a track position of a head to a velocity through respective deceleration phases for different seek lengths, the first storage apparatus selecting a deceleration position-velocity table based on the seek length and selecting a first demand velocity from the selected deceleration position-velocity table based on the identified track position, and the second storage apparatus scales the identified track position to identify a representation of a normalized demand velocity for the scaled track position, and scales the identified representation of the normalized demand velocity to provide the representation of the second demand velocity.

25. The servo apparatus of claim 19, wherein the selector selects the smaller of the representations of the first and second demand velocities.

* * * * *